US011971902B1

(12) United States Patent
Warfield et al.

(10) Patent No.: US 11,971,902 B1
(45) Date of Patent: Apr. 30, 2024

(54) DATA RETRIEVAL LATENCY MANAGEMENT SYSTEM

(71) Applicant: Amazon Technologies, Inc., Seattle, WA (US)

(72) Inventors: Andrew Kent Warfield, Vancouver (CA); Jacob Wires, Vancouver (CA); Seth W. Markle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 17/456,706

(22) Filed: Nov. 29, 2021

(51) Int. Cl.
*G06F 16/27* (2019.01)
*H04L 67/1097* (2022.01)

(52) U.S. Cl.
CPC .......... *G06F 16/27* (2019.01); *H04L 67/1097* (2013.01)

(58) Field of Classification Search
CPC ............................. G06F 16/27; H04L 67/1097
USPC ........................................................ 707/620
See application file for complete search history.

(56) References Cited

U.S. PATENT DOCUMENTS

2013/0019027 A1* 1/2013 Kazan ................... G06F 16/27
709/240

OTHER PUBLICATIONS

M. Rabinovich, et. al. "A dynamic object replication and migration protocol for an Internet hosting service," Proceedings. 19th IEEE International Conference on Distributed Computing Systems (Cat. No. 99CB37003), Austin, TX, USA, 1999, pp. 101-113, doi: 10.1109/ICDCS.1999.776511. (Year: 1999).*

* cited by examiner

*Primary Examiner* — Michael Pham
(74) *Attorney, Agent, or Firm* — Knobbe, Martens, Olson & Bear, LLP (57) ABSTRACT

Systems and methods are provided for management of data access latency in a distributed storage system by dynamically replicating data objects experiencing a high request volume. When a storage node is unable to meet a data access latency target (e.g., due to one or more data objects hosted by the storage node being the subject of a large quantity of requests), the storage node may initiate a process by which a second storage node is employed to reduce the request processing load. The second storage node may cache a copy of the requested data object, and may service at least a portion of requests for the data object using the cached copy.

16 Claims, 6 Drawing Sheets

DATA RETRIEVAL LATENCY MANAGEMENT SYSTEM

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to management of data access latency in a distributed storage system by dynamically replicating data objects experiencing a high request volume. Beneficially, this enables the distributed storage system to maintain a desired degree of latency across all storage nodes and for all data objects stored by the distributed storage system, even during periods of high request volume for a subset of data objects. In particular, when a storage node is unable to meet a data access latency target (e.g., due to one or more data objects hosted by the storage node being the subject of a large quantity of requests), the storage node may initiate a process by which a second storage node is employed to expand the pool of nodes available to service such requests, and thereby reduce the request processing load on the first storage node. The first storage node may provide a replica of a requested data object to the second storage node so that the second storage can service requests for the object. The second storage node may cache a copy of the requested data object, and may service at least a portion of future requests for the data object using the cached copy. Thus, by providing the replica of the requested data object to the second storage node, the first storage node may lighten its own future processing load by many times the amount of work needed to provide the replica to the second storage node. If the second storage node also becomes loaded and is unable to meet the data access latency target, the second storage node may initiate the process so that a third storage node is employed, and so on as needed to meet the data access latency target.

Some conventional storage systems allow expansion of storage capacity. For example, if a data owner requires additional storage capacity to store newly generated data, additional storage volumes may be provisioned for the data owner to use, or the data owner may be permitted to dynamically utilize available storage capacity without necessarily provisioning a storage volume first. Some conventional storage systems allow expansion of throughput, or maintenance of existing throughput for ever larger data objects, by segmenting data objects into smaller component data objects, and storing the smaller component data objects on different storage nodes. Then, requests for data objects can be serviced with a relatively high degree of throughput (e.g., in comparison with a single storage node) by requesting the smaller component data objects in parallel from the multiple different storage nodes. However, when there is a large volume of requests for particular objects, latency may increase due to a bottleneck at the storage nodes from which the objects (or potions thereof) are to be obtained. Segmenting the data objects and storing the segments on different nodes for parallel retrieval does not address the latency experienced due to a high request rate at individual nodes. Such latency may be particularly undesirable in interactive applications and other applications that wait for receipt of requested data before continuing with a workload.

Some aspects of the present disclosure address the issues noted above, among others, by monitoring—at the data storage node level-metrics that are relevant to latency analysis and mitigation. In some embodiments, a storage node may monitor the quantity of requests per unit of time received for each data object stored on the storage node (or a subset of data objects). Once the quantity of requests for a particular data object reaches a threshold at or above which the storage node may no longer be able to meet a data access latency target (e.g., the data object is a "hot object"), the storage node may initiate a process to replicate the hot object and employ additional computing resources to service requests for the hot object. In some embodiments, a storage node may monitor the overall latency that it is experiencing in responding to requests for any data object stored on the storage node, in addition to monitoring request volume for individual data objects. For example, the storage node may determine the latency for individual requests in terms of the length of time from receipt of the request to transmission of the requested data object. If this latency reaches or exceeds a threshold (or satisfies some other criterion), then the storage node may initiate the process of replicating one or more hot objects and employing additional computing resources to service requests for the hot object(s) in order to reduce the latency caused by or otherwise experienced by the storage node. In some embodiments, additional factors may be considered in determining whether the latency experienced by the storage node satisfies a criterion related to data access latency. For example, data accessors may provide, with requests for data objects, data regarding the latency currently experienced by the data accessors when requesting the data objects. Storage nodes may use this information as a factor in determining whether data access latency satisfies a criterion for initiating replication of hot data objects and adding resources.

Additional aspects of the present disclosure relate to a process of replicating hot data objects and employing additional computing resources to service requests for the replicated hot data objects in an effort to reduce data access latency. In some embodiments, requests for data objects may be managed by a gateway. The gateway may be part of the data accessor system, or the gateway may serve as an intermediary between data accessors and storage nodes. When a data object is requested, the gateway may determine which storage node is to service the request. For example, the storage node may be one node of a subset of all storage nodes of the distributed storage system, whereby nodes in the subset are assigned to service requests for the particular data object being requested (among others). Illustratively, the gateway may select a particular storage node from the subset using a load balancing mechanism. The gateway may then send the request to the selected storage node, which may be referred to as the "target storage node" to indicate its status as the initial target of the request. When the target storage node receives the request, it may determine that one or more data access latency-related criteria are satisfied, as described above and in greater detail below. The target storage node may then select or otherwise identify an additional storage node to service requests for the data object. The additional storage node may not be in the subset of storage nodes originally assigned to service requests for the particular data object being requested (e.g., the additional storage node may not currently have a copy of the data object). The target storage node may then respond to the request by indicating, to the gateway, that the request is to be serviced by the additional storage node rather than the target storage node. The response may be referred to as a redirection response, to indicate its purpose of redirecting the request to the additional storage node. The gateway may then request the data object from the additional storage node. The additional storage node may obtain a copy of the requested data object from the target storage node (e.g., in response to the request from the gateway, or the target storage node may proactively provide the data object to the additional storage node). The additional storage node may then store the copy in a cache, and service the request by providing the copy to the gateway. As with the target storage node, the additional storage node may track data access latency-related criteria, initiate the process of replicating hot data objects, and employ additional computing resources to service requests for the replicated hot data objects as needed. This can produce a dynamically expanding pool of computing resources to service requests for the hot data object (and any number of other hot data objects).

In some embodiments, after receiving the redirection response from the target storage node, the gateway may add the additional storage node to the subset of storage nodes assigned to respond to requests for the data object. For example, the gateway may maintain a mapping of data objects to storage nodes, and the gateway may add the additional storage node to the mapping for the requested hot data object on at least a temporary basis. In this way, the load balancing performed by the gateway may use a larger subset of storage nodes for the hot data object. In some embodiments, including the additional storage node in the subset of storage nodes may apply for a particular period of time, for a particular number of requests, or until a criterion is satisfied (e.g., data access latency is below a threshold, a quantity of requests for the hot data object is below a threshold, etc.).

Various aspects of the disclosure will now be described with regard to certain examples and embodiments, which are intended to illustrate but not limit the disclosure. Although aspects of some embodiments described in the disclosure will focus, for the purpose of illustration, on particular examples of storage systems, access classifications, data sets, and service operations, the examples are illustrative only and are not intended to be limiting. In some embodiments, the techniques described herein may be applied to additional or alternative storage systems, access classifications, data sets, service operations, and the like. Any feature used in any embodiment described herein may be used in any combination with any other feature, without limitation.

Overview of Example Computing Environment

Figure 1:
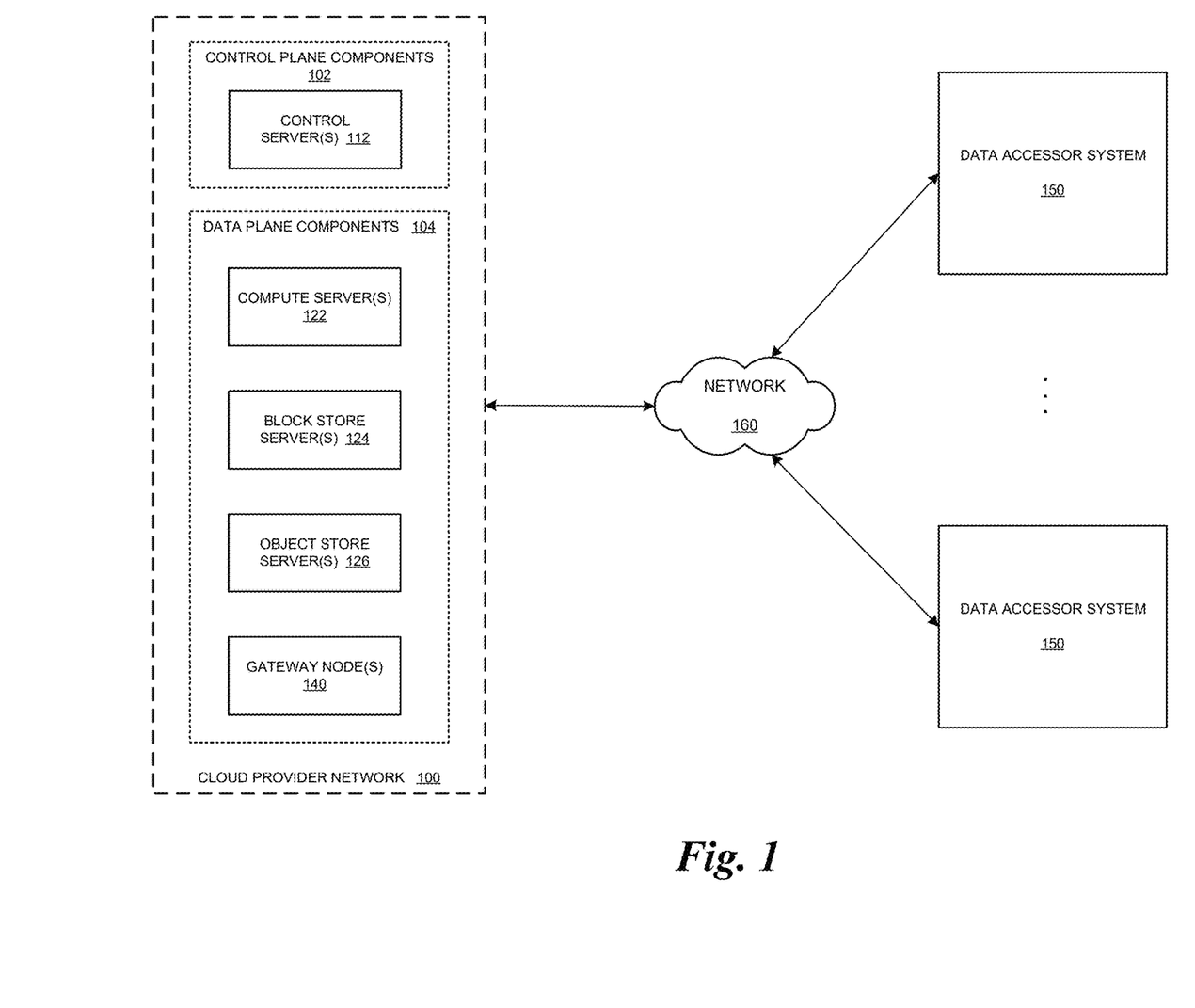
FIG. 1 is a block diagram depicting an illustrative environment in which a storage system with latency management can operate according to some embodiments.

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), and any number of data accessor systems 150 (also referred to herein simply as "data accessors" for convenience) that access data at the cloud provider network 100 or otherwise interact with the cloud provider network 100 regarding data stored. The cloud provider network 100 and data accessors 150 may communicate with each over via an intermediate network 160, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a physical computing device. Unlike physical computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. Each region can include one or more availability zones and when regions include more than one availability zone, availability zones can be connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one another that a natural disaster should not impact more than one availability zone at the same time. Customers can connect to availability zones of the cloud provider network via a publicly accessible network (e.g., the Internet, a cellular communication network). Transit Centers ("TC") are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, the data plane may include one or more gateway nodes 140 configured to implement aspects of the present disclosure for routing data requests to individual storage servers (e.g., individual block store servers 124, individual object store servers 126, etc.). A gateway node 140 may be implemented on a separate server or set of servers from storage servers such as block store servers 124 or object store servers 126, or the gateway node 140 may share one or more virtualized servers with storage servers. In some embodiments, gateway nodes 140 or certain modules or components thereof may be part of the control plane such that they are control plane components 102.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. A piece of the cloud provider network—referred to herein as a "provider substrate extension" or PSE—may be provisioned within the customer's network. A customer may access their PSE via the cloud provider network 100 or their own network, and may use the same APIs to create and manage resources in the PSE as they would use to create and manage resources in the cloud provider network 100 region.

The PSE may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Example Computing Device to Manage Access to Data

Figure 2:
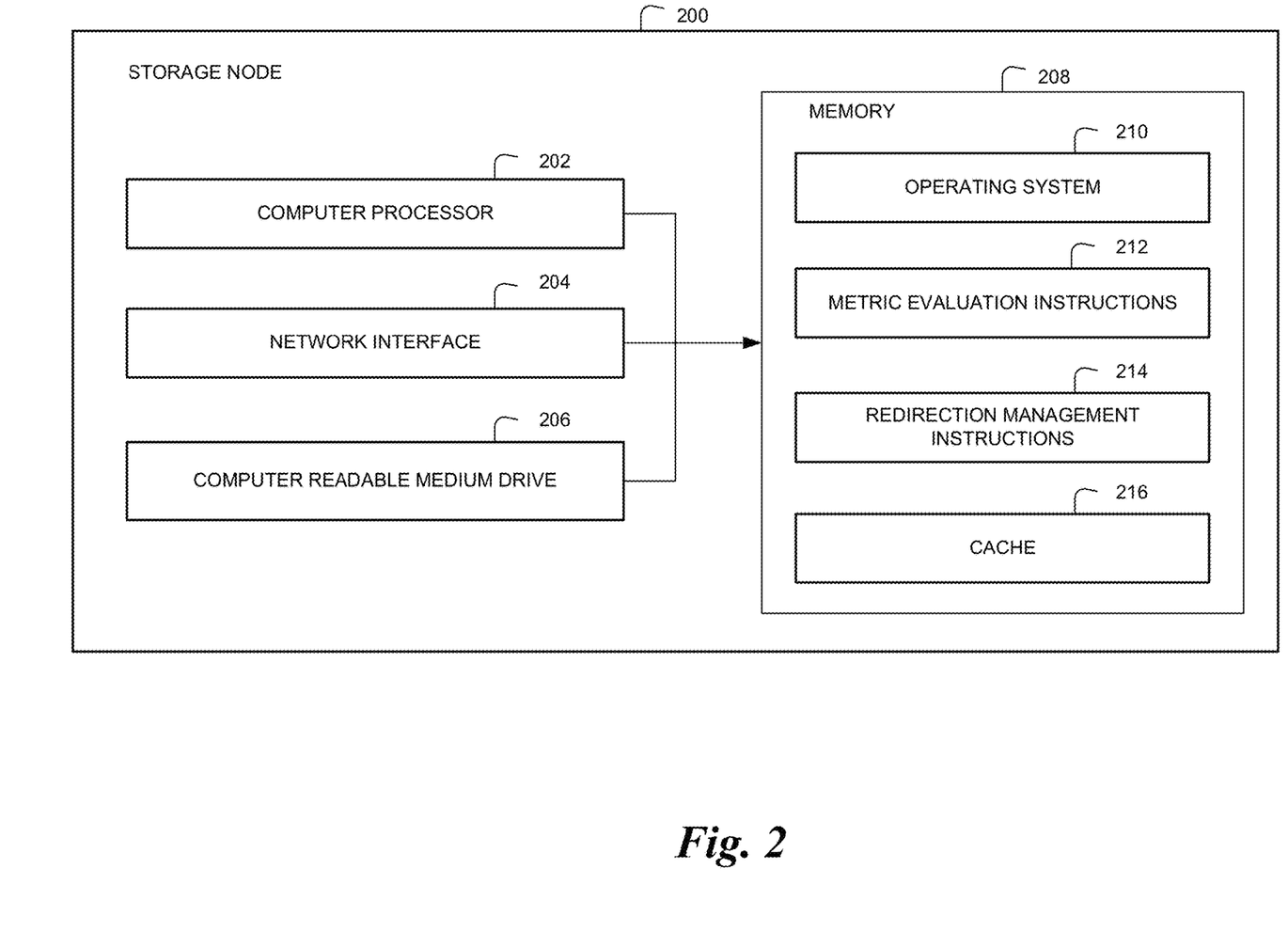
FIG. 2 is a block diagram of an illustrative computing device configured to implement features of data retrieval latency management according to some embodiments

FIG. 2 illustrates various components of an example storage node 200 configured to implement various functionality described herein. The storage node 200 may be a physical host computing device on which a storage server is implemented, such as a block store server 124 or an object store server 126. The storage nodes 200 may provide access to data stored thereon in response to requests from data accessors, such as data accessors 150 external to the cloud provider network 100, or data accessors internal to the cloud provider network (e.g., data accessors 150 implemented on compute servers 122). There may be any number of such storage nodes 200 in the cloud provider network 100.

In some embodiments, as shown, a storage node 200 may include: one or more computer processors 202, such as physical central processing units ("CPUs"); one or more network interfaces 204, such as a network interface cards ("NICs"); one or more computer readable medium drives 206, such as a high density disk ("HDDs"), solid state drives ("SSDs"), flash drives, and/or other persistent non-transitory computer-readable media; and one or more computer readable memories 208, such as random access memory ("RAM") and/or other volatile non-transitory computer-readable media.

The computer readable medium drives 206 may be used to store data that may be provided to data accessors upon requests. The specific type of data stored and provided may depend on the implementation of the storage node 200 (e.g., as a block store server 124, an object store server 126, etc.). The examples herein use the term "data object" to refer to the particular item of data requested, retired from storage, and provided in response to the request, regardless of whether the particular item of data is a value, a file, a storage volume image, or some other data object.

The computer readable memory 208 may include computer program instructions that one or more computer processors 202 execute in order to implement one or more embodiments. The computer readable memory 208 can store an operating system 210 that provides computer program instructions for use by the computer processor(s) 202 in the general administration and operation of the computing device 200.

In some embodiments, the computer readable memory 208 can further include computer program instructions and other information for implementing aspects of the present disclosure. For example, the computer-readable memory 208 may include access metric evaluation instructions 212 for generating data access metrics, evaluating redirection criteria, and the like as described herein. As another example, the computer-readable memory 208 may include redirection management instructions 214 for managing the redirection responses, responding to requests from other storage nodes, and the like as described herein.

When a routine is initiated, a corresponding set of executable program instructions stored on a computer readable medium drive 206 may be loaded into computer readable memory 208 and executed by one or more computer processors 202. In some embodiments, a routine—or portions thereof—may be implemented on multiple computing devices and/or multiple processors, serially or in parallel.

The computer readable memory 208 may further include a cache 216 to store frequently-requested data objects (e.g., so that the data objects do not need to be retrieved from a computer readable medium drive 206 in response to each request) and/or hot data objects retrieved from other storage nodes 200 in response to redirected requests as described herein.

Dynamic Replication and Redirection

Figure 3:
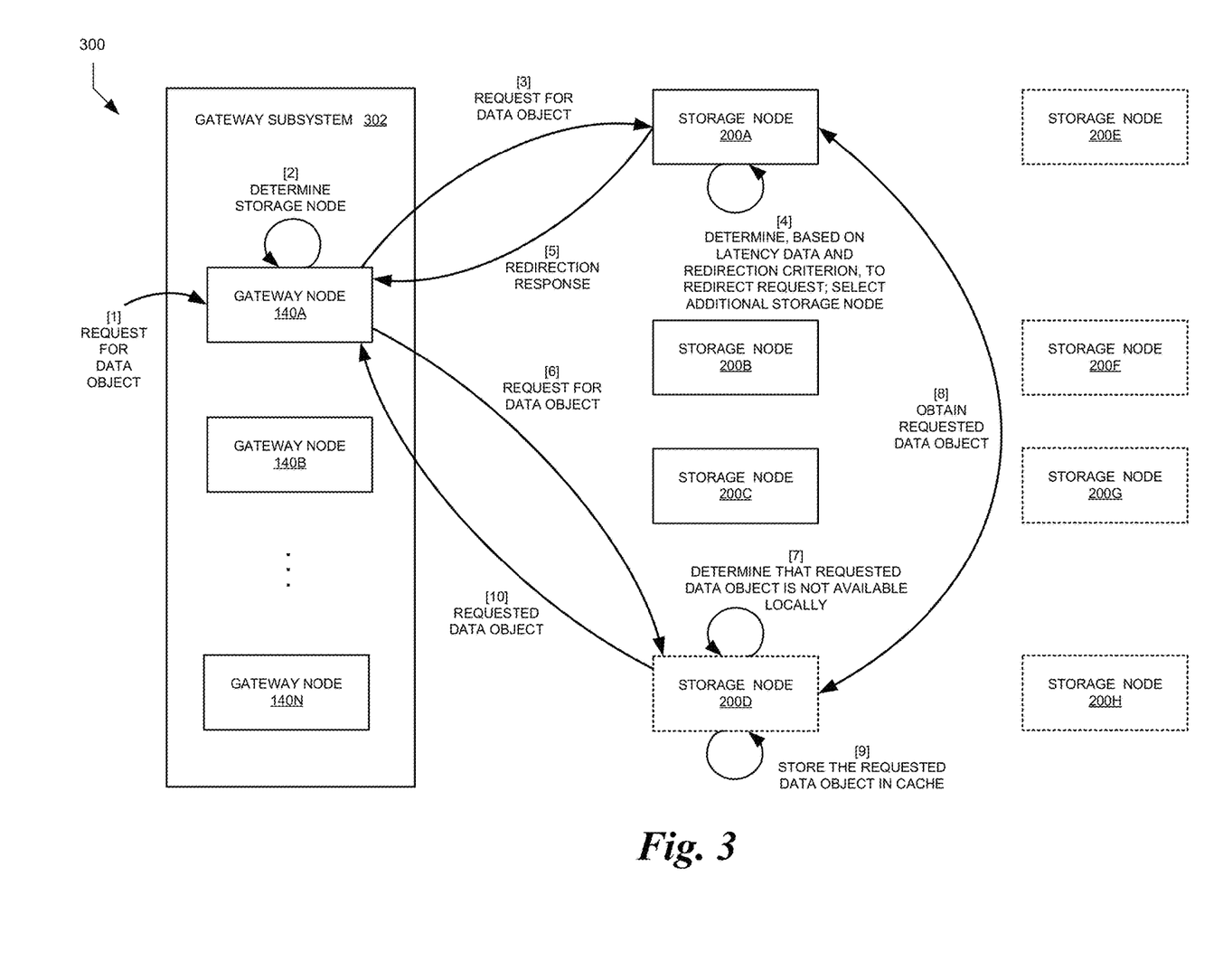
FIG. 3 is a block diagram of illustrative data flows and interactions of components of a storage system to manage data access latency through elastic replication of hot objects according to some embodiments.

FIG. 3 illustrates example data flows and interactions between various components of a distributed storage system 300, such as a distributed storage system implemented on a cloud provider network 100 and including various systems, devices, and components described above. In the illustrated example, a gateway node communicates with various storage nodes to service a request for a hot data object and dynamically expand the pool of storage nodes available to service requests for the data object in the future, thereby maintaining a desired degree of latency.

At [1], a gateway node 140A may receive a request for a data object. The request may originate from a data accessor 150. The data accessor 150 may be external to the cloud provider network 100 as shown in FIG. 1, or the data accessor 150 may be internal to the cloud provider network 100, such as a data accessor 150 implemented on a compute server 122.

The gateway node 140A may serve as an intermediary between data accessors 150 and storage nodes 200. For example, the gateway node 140A may maintain or access an index or other mapping data that indicates the storage node(s) 200 on which the requested data object is stored. The gateway node 140A can select the storage node 200 to service the incoming request based on the mapping data (and a load balancing algorithm if multiple storage nodes 200 store copies of the requested data object). In some embodiments, the distributed storage system 300 may include a gateway subsystem 302 that includes multiple gateway nodes 140A, 140B, . . . , 140N. The specific gateway node 140A for a given incoming request may be selected according to a load balancing mechanism.

At [2], the gateway node 140A may determine the storage node 200 of the distributed storage system 300 from which to request the data object. In some embodiments, the distributed storage system 300 may include a plurality of storage nodes 200A, 200B, 200C, 200D, 200E, 200F, 200G, 200H, etc. For example, the distributed storage system 300 may be a distributed object storage system with a plurality of object store servers 126. In this example, storage nodes 200A-200H correspond to individual object store servers 126.

Each data object stored by the distributed storage service 300 may be stored one or more store nodes 200. For example, the distributed storage service 300 may store multiple copies (also referred to as replicas) of each data object, and each copy may be stored on a different storage node. In this way, storage of the data object may be more durable than storing only a single copy of a data object on a single storage node. In addition, or alternatively, using multiple replicas of each data object and storing them on multiple different storage nodes can allow for load balancing. For example, copies of a first data object may be stored on a first subset of the storage nodes of the distributed storage system 300, copies of a second data object may be stored on a second subset of the storage nodes which may or may not overlap partially or completely with the first subset, and so on.

When a gateway node 140A receives a request for a particular data object, the gateway node 140A may determine the subset of storage nodes that store copies of the data object (e.g., using an index or other mapping data). The gateway node 140A may select one of the storage nodes using a load balancing algorithm to service the request. In the illustrated example, the requested data object may be available from the first subset of storage nodes including storage nodes 200A, 200B, and 200C, as indicated by solid lines, and the gateway node 140A may select storage node 200A. The remainder of the storage nodes (e.g., the second subset of storage nodes) may not have an available copy of the requested data object, and are illustrated by dotted lines.

At [3], the gateway node 140A can send a request to the selected storage node 200A.

At [4], the storage node 200A may determine whether to respond to the request by providing the requested data object to the gateway node 140A, or by sending a redirection response to cause the gateway node 140A to request the data object from another storage node.

In some embodiments, the storage node 200A may monitor one or more metrics that are relevant to latency analysis and mitigation. For example, the storage node 200A may monitor the quantity of requests over a period of time and/or per unit of time received for each data object stored on the storage node 200A, or for some subset of the data objects stored on the storage node 200A. The storage node 200 may evaluate one or more metrics against one or more criteria to determine whether to redirect the request to a different storage node. For example, the storage node 200A may evaluate the quantity of requests for the currently-requested data object against a threshold at or above which the storage node 200A may no longer be able to meet a data access latency target. If the quantity of requests for the currently-requested data object exceeds the threshold, then the data object may be classified as a "hot object." The storage node 200A node may initiate a process to replicate the hot object and employ additional computing resources to service requests for the hot object.

In some embodiments, the storage node 200A may monitor the overall latency that it is experiencing in responding to requests for any data object stored on the storage node 200A. For example, the storage node 200A may determine the length of time to process individual requests from receipt of each request to transmission of the requested data objects. The storage node 200 may then evaluate the latency against one or more criteria to determine whether to redirect the current request to a different storage node. For example, if the latency reaches or exceeds a threshold (or satisfies some other criterion), then the storage node may initiate the process of replicating one or more hot objects and employing additional computing resources to service requests for the hot object(s) in order to reduce the latency experienced by the storage node.

If one or more redirection criteria are satisfied, the storage node 200A may select another storage node to which the current request (and any number of future requests) is to be redirected. In some embodiments, the selected storage node may be selected from the subset of storage nodes not currently assigned to service requests for the requested data object. In the illustrated example, the storage node 200A may select from the second subset of storage nodes indicated in dotted line. For example, the storage node 200A may select storage node 200D using a randomized selection algorithm.

Figure 5:
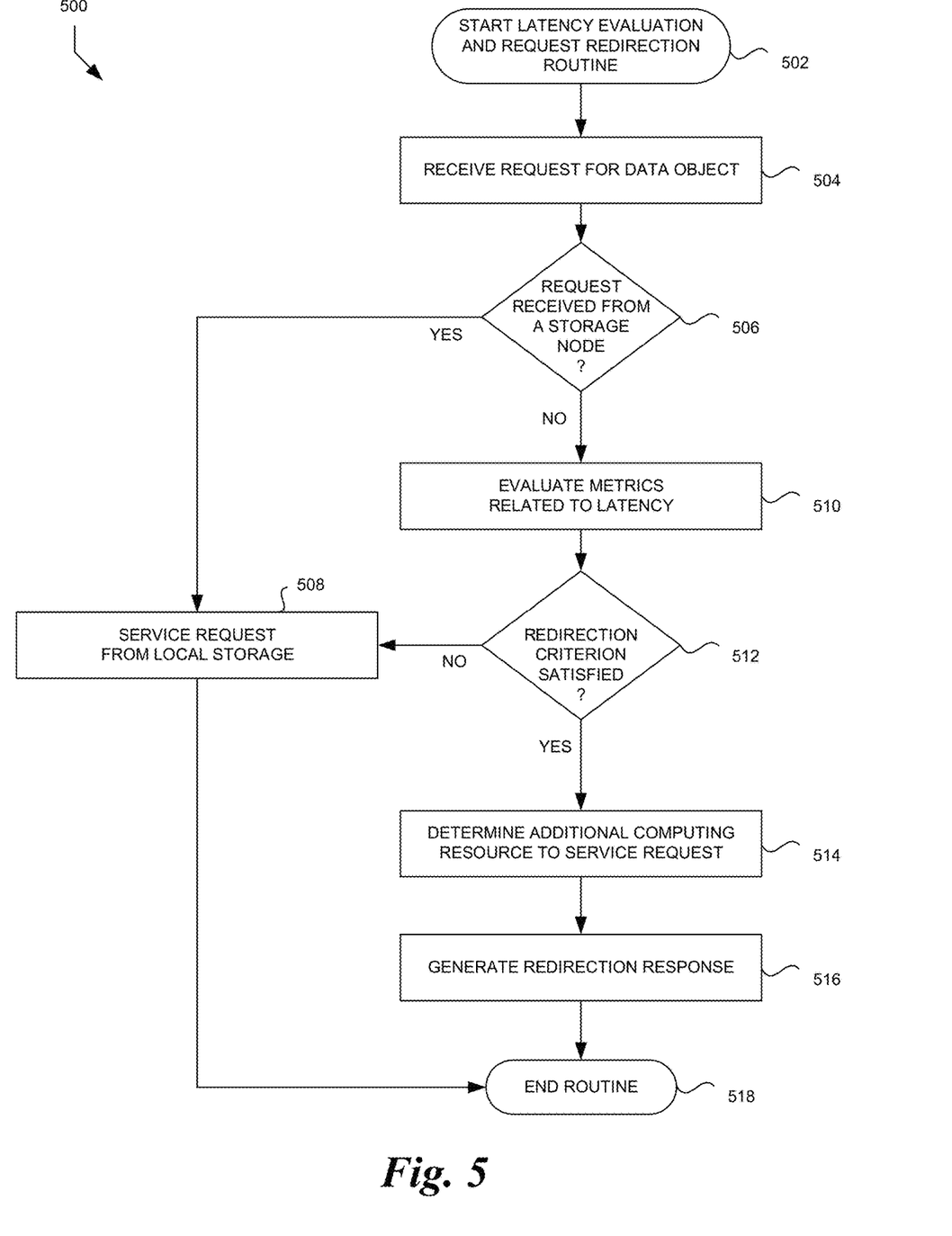
FIG. 5 is a flow diagram of an illustrative routine for managing data access latency and elastic replication of hot objects according to some embodiments.

An example routine for monitoring metrics, evaluating criteria, and initiating replication and employment of additional computing resources is illustrated in FIG. 5 and described in greater detail below.

At [5], the storage node 200A may generate and send a redirection response to the gateway node 140A. The redirection response may indicate that the storage node 200A is not providing the requested data object, and that the gateway node 140A is to request the data object from the selected additional storage node-storage node 200D in this example. For example, the redirection response may provide a network address (e.g., an IP address), a host name, or some other identifier and/or location information for the additional storage node 200D. In some embodiments, the redirection response may indicate a quantity of future requests and/or a period of time during which the currently-requested data object is to be requested from storage node 200D instead of storage node 200A. In some embodiments, the redirection response may indicate a quantity of future requests and/or a period of time during which the data object is to be included in the first subset of storage nodes for the currently-requested data object (e.g., the additional storage node 200D is to be added to the first subset of storage nodes and included in future load balancing decisions for the currently-requested data object).

At [6], the gateway node 140A can send a request to the additional storage node 200D for the data object that the gateway node 140A originally requested from storage node 200A. In some embodiments, the request may include an indication that the gateway node 140A has been redirected to the additional storage node 200D from storage node 200A. For example, the request may include header data, a parameter, or other data indicating the redirected nature of the request. The request may include further data indicating the storage node from which the request was redirected-storage node 200A in this example.

At [7], upon receipt of the redirected second request from the gateway node 140A, the additional storage node 200D can determine that the request is for a data object that is not currently stored on the additional storage node 200D. In some embodiments, storage node 200D may make the determination based on data included in the request (e.g., data indicating the redirected nature of the request). In some embodiments, the storage node 200D may make the determination based on checking its own storage for the presence of the requested data object and determining that the requested data object is not present.

At [8], storage node 200D can obtain the data object from the original target of the request: storage node 200A. For example, the request from gateway node 140A may include data indicating storage node 200A was the original target of the request. Based on this data, storage node 200D may obtain the requested data object from storage node 200A.

To obtain the data object from storage node 200A, storage node 200D may send a request that includes data (e.g., a header, parameter, or the like) that indicates the request is being performed in response to the redirection response that storage node 200A sent to gateway node 104A. This may be done to ensure that storage node 200A provides the requested data object to storage node 200D rather than providing another redirection response. In some embodiments, storage node 200A may determine that the data object is being requested by the same node that it recently selected for redirection, and may respond to the request automatically without necessarily receiving additional data from storage node 200D referencing the redirection.

At [9], storage node 200D may store the requested data object in a cache for use in servicing future requests for the data object. In some embodiments, the storage node 200D may be configured to use a particular portion of available storage space (e.g., a maximum amount of random access memory) for use as a cache for hot data objects hosted by other storage nodes, and the remaining portion is to be reserved for use in caching recently-requested objects that the storage node 200D is normally assigned to store and make available.

At [10], storage node 200D may provide the requested data object to gateway node 140A in response to the request received from gateway node 140A. In some embodiments, storage node 200D may provide the requested data object directly to the data accessor 150 that requested the object, without the requested data object being sent first to the gateway node 140A.

Figure 4:
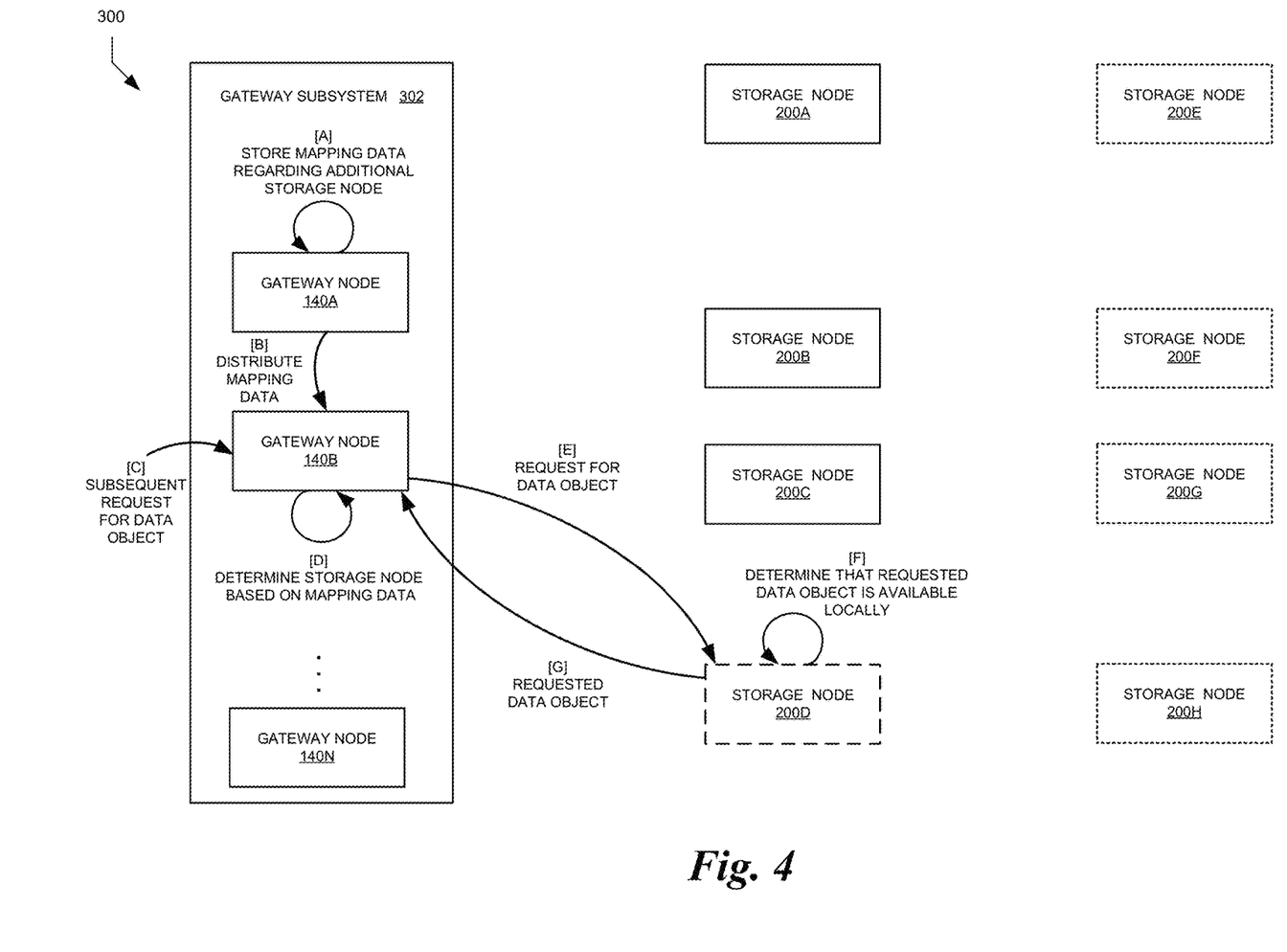
FIG. 4 is a block diagram of illustrative data flows and interactions of components of a storage system to manage data access latency and elastic replication of hot objects according to some embodiments.

Turning now to FIG. 4, additional interactions between gateway nodes and storage nodes are illustrated. The additional interactions include those that may occur after a redirection response, such as that described above. Various interactions shown in FIG. 4 may be performed prior to, in parallel with, subsequent to, or asynchronously with various interactions shown in FIG. 3. To highlight such differences in timing, the interactions shown in FIG. 4 are labeled using letters rather than numerals. The description that follows includes certain examples of such timing, however the examples are not intended to be limiting, required, or exhaustive. In some embodiments, any, all, or alternative timing variances may be implemented.

At [A], gateway node 140A may store index data or other mapping data representing the inclusion of storage node 200D in the first subset of storage nodes or otherwise representing the assignment of the storage node 200D to the requested data object. In some embodiments, gateway node 140A may store the mapping data prior to sending a second request to additional storage node 200D. In some embodiments, gateway node 140A may store the mapping data in parallel with or asynchronously with obtaining the requested data object from additional storage node 200D. In some embodiments, gateway node 140A may store the mapping data subsequent to sending a second request to additional storage node 200D.

At [B], gateway node 140A may notify one or more other gateway nodes that storage node 200D is to be included in future determinations of a storage node from which to request the data object. In some embodiments, gateway node 140A and other gateway nodes 140B . . . 1040N may use a gossip protocol to notify each other of the addition of individual storage nodes for individual data objects. For example, the gateway node that has received a redirection response (gateway node 140A in this example) may notify n other gateway nodes of the gateway subsystem 302 that the additional storage node (storage node 200D) is to be included in further load balancing determinations for retrieval of the data object, where $0<n<=$ total number of gateway nodes of the gateway subsystem 302. Each other gateway node in receipt of the notification (or some subset thereof) may continue to notify other gateway nodes, and so on until each gateway node is notified. In some embodiments, gateway node 140A may notify other gateway nodes prior to, in parallel with, subsequent to, or asynchronously with storing the mapping data, sending a second request to additional storage node 200D, and/or performing other operations. In some embodiments, gateway node 140A sends a notification and/or mapping data to a mapping system, which then distributes data regarding the updated mapping to other gateway nodes of the gateway subsystem 302. Receipt by the mapping system of such a notification may trigger distribution of the data regarding the updated mapping to the other gateway nodes.

At [C], a second request for the data object may be received by the distributed storage system 300. Illustratively, the second request may be received from a data accessor 150 prior to, in parallel with, or subsequent to gateway node 140A obtaining the data object from the additional storage node 200D in response to the redirection response described above. In some embodiments, the specific gateway node 140B assigned to handle the second request may be selected instead of gateway node 140A according to a load balancing mechanism.

At [D], gateway node 140B can determine the storage node from which to obtain the data object in response to the second request. Gateway node 140B may determine which subset of storage nodes store the data object (e.g., using an index or other mapping data). As described above with respect to gateway node 140A and the prior request for the data object, gateway node 140B may select one of the storage nodes using a load balancing algorithm to service the request. In the illustrated example, the requested data object may be available from the first subset of storage nodes, which now also includes storage node 200D as indicated by dashed line instead of dotted line. The gateway node 140A may select storage node 200D.

At [E], gateway node 140B can send a request for the data object to the selected storage node 200D.

At [F], storage node 200D may determine how to respond to the request from gateway node 140B. Storage node 200D may determine whether the requested data object is available on the storage node 200D. For example, storage node 200D may determine whether the requested data object is available in persistent storage or otherwise normally assigned to the storage node 200D, or whether the requested data object is available in a cache for use in responding to requests for hot data objects assigned to other storage nodes. In some embodiments, storage node 200D may determine whether to send a redirection response to cause the gateway node 140B to request the data object from another storage node, as described above with respect to storage node 200A. For example, if storage node 200D experiences a high volume of request for the data object, experiences a high degree of latency for responding to data object requests, or otherwise determines that a redirection criterion has been satisfied, the storage node 200D may select another storage node and generate a second redirection response to the second request for the data object. In this way, the subset of storage nodes available to respond to requests for the hot data object may continue scaling (e.g., in a tree-like or other graph-like fashion) to address spikes or other increases in requests for the hot data object or data objects altogether.

In the illustrated example, storage node 200D may determine to provide the requested data object out of the cache, where it was stored after receiving the redirected request from gateway node 140A as described above.

At [G], the storage node 200D can provide the requested data object to gateway node 140B. In some embodiments, storage node 200D may provide the requested data object directly to the data accessor 150 that requested the object, without the requested data object being sent first to the gateway node 140A.

Example Routine for Latency Evaluation, Data Replication, and Redirection

FIG. 5 is a flow diagram of an example routine 500 that a storage node 200 may execute for tracking latency-related metrics, evaluating redirection criteria, initiating the addition of a storage node to service requests, and redirecting a response to the additional storage node. Advantageously, this enables the distributed storage system to maintain a desired degree of latency across all storage nodes and for all data objects stored by the distributed storage system, even during periods of high request volume for a subset of data objects. Portions of the routine 500 will be described with reference to the illustrative data flows and interactions shown in FIGS. 3, 4, and 6.

The routine 500 beings at block 502. In some embodiments, routine 500 may begin in response to an event, such as startup of operation of a storage node 200.

At block 504, a storage node 200 or some other module or component may receive a request for a data object. The requested data object may correspond to any type, form, or amount of requested data. For example, the requested data object may be a value, a record, a volume image, or some other data object. In some embodiments, the requested data object may be a fragment of a larger data object originally requested by a data accessor 150. For example, the distributed storage system 300 may be configured to store data using erasure coding, redundant array of inexpensive disks ("RAID"), or some other storage virtualization technology that provides data redundancy based on fragmented storage of data objects. The specific data object currently requested from storage node 200 may be one of such fragments.

The request may be received from a gateway node 140. For example, as shown in FIG. 3 and described in greater detail above, the request may be received from one of a plurality of gateway nodes 140 after being initiated by a data accessor 150 and assigned to a gateway node 140 using a load balancing algorithm. As another example, the request may be a request from another storage node, after the current storage node selected the other storage node and generated a redirection response indicating the data object is to be obtained from the other storage node.

Figure 6:
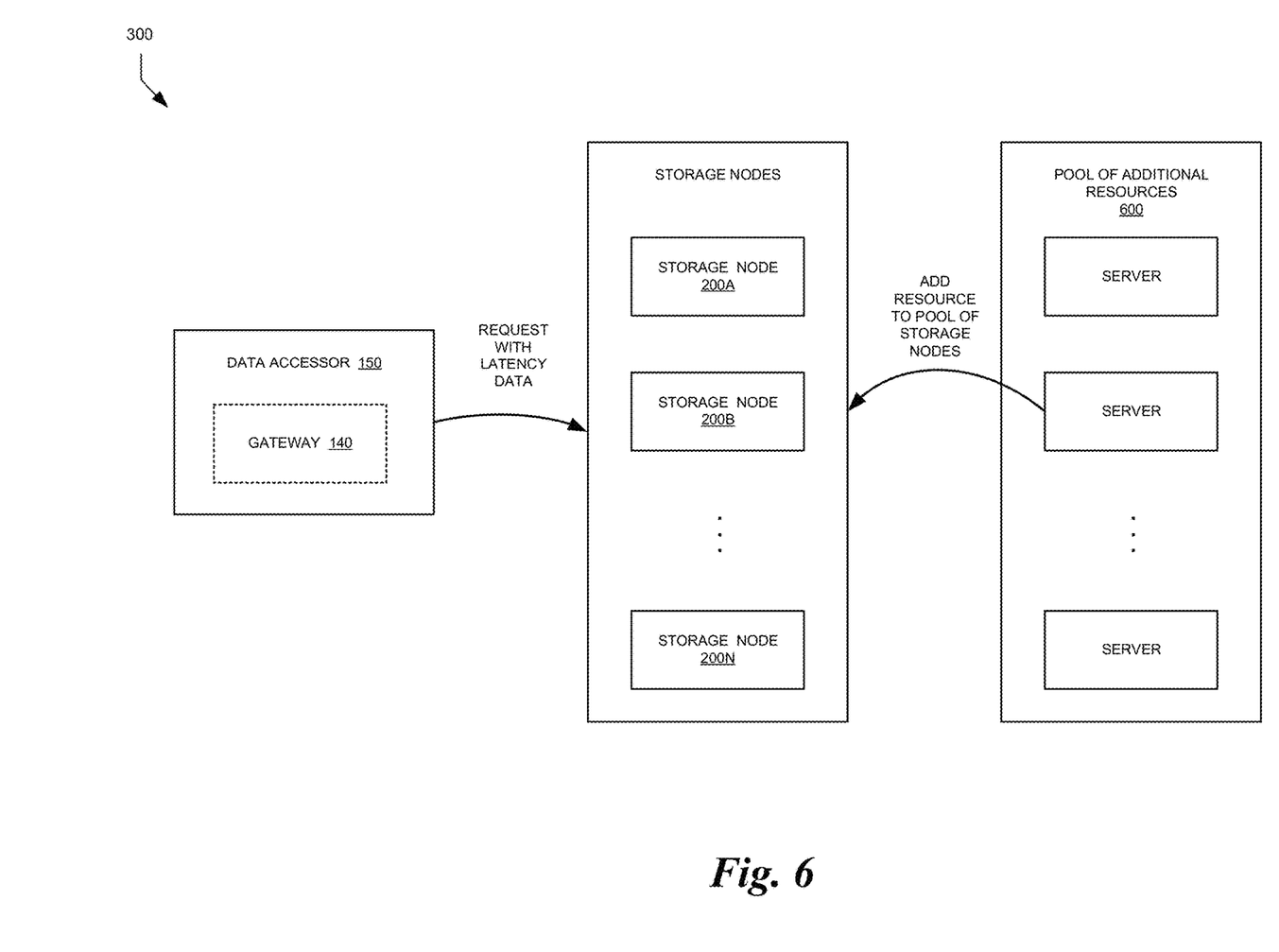
FIG. 6 is a block diagram of illustrative data flows and interactions of components of a storage system to manage data access latency and elastic replication of hot objects according to some embodiments.

In some embodiments, the request may be received from a data accessor 150. For example, there may not be a separate set of gateway nodes that serve as intermediaries between data accessors 150 and storage nodes 200. Rather, as shown in FIG. 6, data accessors 150 may include gateways 140 to determine the appropriate storage node from which to request a data object once the data accessor 150 determines to request the data object.

At decision block 506, the storage node 200 may determine whether the request has been received from another storage node 200 (e.g., after the current storage node 200 selected the other storage node and sent a redirection response to a gateway node indicating the gateway node is to request the data object from the other storage node). If so, the routine 500 may proceed to block 508, where the storage node 200 executing the current instance of routine 500 can provide the requested data object to the other storage node 200 in order to offload work to the other storage node 200. Otherwise, if the request is not received from another storage node, the routine 500 can proceed to block 510.

At block 510, the storage node 200 may generate, update, obtain, or otherwise evaluate one or more metrics related to latency of the storage node. In some embodiments, the storage node 200 may maintain request trackers for each data object stored on the storage node 200, or some subset of the data objects. For example, each time a request is received for a particular data object, the storage node 200 may update the request tracker for the requested data object by increasing the quantity of requests received for the data object over a period of time, recalculating a rate of requests received for the data object per unit of time, or the like. In some embodiments, the storage node 200 may maintain a latency tracker to track the length of time taken by the storage node 200 to send a response to a prior request after receiving the prior request. For example, the performance of the storage node 200 may be limited by the available bandwidth of the network interface of the storage node 200, the processing capacity of the storage node 200, other factors, or some combination thereof. Therefore, although the storage node 200 may be capable of processing and responding to a request within a particular period of time after receiving the request (e.g., n milliseconds, where n is less than an upper threshold for request processing latency), the storage node 200 may require a greater period of time when the storage node is loaded (e.g., m milliseconds, where m is greater than the upper threshold).

In some embodiments, the storage node 200 may evaluate information received from external sources. For example, the total latency experienced by data accessors 150 is typically in excess of that of the storage node 200 in responding to the request (e.g., due to additional network communications, intermediary processing, etc.). As shown in FIG. 6, data accessors 150 may include, in requests for data objects, data regarding latency experienced in connection with prior requests. The storage node 200 may use this information instead of and/or in combination with metrics about request quantity and/or latency experienced by the storage node 200 itself.

In some embodiments, networking devices between the data accessor 150, gateway node 140, and/or storage node may serve as latency sensors, and may provide latency data or otherwise make latency data available to the storage node 200 for consideration. For example, there may be a network switch that becomes overwhelmed such that even if the storage node 200 is not overwhelmed, some or all of the data accessors 150 experience a high degree of latency when obtaining data. By making such latency information available to the storage node 200, the storage node 200 may select another storage node that is available to the data accessors 150 via a different switch (e.g., the other storage node is on the same rack or in the same data center room as the data accessors 150).

Evaluation of the metrics may include evaluating them against a threshold or range to determine whether the metrics are indicative of poor performance, or otherwise trigger redirection and addition of storage nodes. In some embodiments, the storage node 200 may determine whether a measured amount of latency (as measured by the storage node 200 and/or data accessor 150) exceeds a threshold. In some embodiments, the storage node 200 may determine whether a measured quantity of requests for the currently-requested data object exceeds a threshold. The example evaluations described herein are not intended to be limiting, required, or exhaustive. In some embodiments, additional and/or alternative evaluations may be performed.

At decision block 512, the storage node 200 may determine whether one or more criteria are satisfied for initiating request redirection and addition of computing resources. In some embodiments, the determination may be a determination of whether a latency metric (e.g., the length of time to respond to a request, the length of time for a data accessor to receive requested data, etc.) meets or exceeds a threshold. If so, the storage node 200 may determine to initiate request redirection and addition of computing resource. Such a criterion may be referred to as a redirection criterion.

If one or more criteria (e.g., redirection criteria) are satisfied, the routine 500 may proceed to block 514. Otherwise, if the one or more criteria are not satisfied, the routine 500 may proceed to block 508 where the requested data object is obtained and provided to the gateway node 140 or data accessor 150 from which the request was received.

At block 514, the storage node 200 determines a computing resource to which the current request (and any number of future requests) is to be redirected. In some embodiments, the storage node 200 may select another storage node of the distributed storage system 300 to which the request is to be redirected and which is to be added as a storage node for servicing future requests for the data object. For example, the storage node 200A, which is part of the first subset of storage nodes assigned to service requests for the data object, may select a storage node from the remaining storage nodes of the distributed storage system 300, such as storage node 200D, so that the size of the first subset is larger for handling requests for the hot data object.

In some embodiments, computing resources outside of the pool of active storage nodes of the distributed storage system 300 may be employed. As shown in FIG. 6, there may be a pool 600 of additional computing resources, such as servers, from which the storage node 200 may select. For example, the storage node 200 may select a new server to be added, on a temporary basis, to the pool of active storage nodes, and to the first subset of storage nodes in particular.

At block 516, the storage node 200 can generate and send a redirection response to the requesting device. The redirection response may include data identifying the additional computing resource determined at block 514, or other data that the requesting device may otherwise use to request the data object from the determined computing resource.

The routine 500 may terminate at block 518.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A data storage system comprising:
a plurality of gateway nodes; and
a plurality of storage nodes, wherein a first subset of the plurality of storage nodes each store a copy of a first data object, and wherein a first storage node of the first subset of the plurality of storage nodes is configured to at least:
receive, from a first gateway node of the plurality of gateway nodes, a first request for the first data object;
determine that a latency threshold associated with the first data object is exceeded;
select a second storage node of a second subset of the plurality of storage nodes using a randomized selection algorithm;
send a redirection response to the first gateway node, wherein the redirection response indicates that the first gateway node is to obtain the first data object from the second storage node;
receive, from the second storage node, a second request for the first data object;
determine, based at least partly on the second request being from the second storage node, to provide a copy of the first data object to the second storage node; and
send the copy of the first data object to the second storage node in response to the second request; and
wherein the first gateway node is configured to at least:
determine to send the first request to the first storage node based at least partly on a mapping of the first storage node to the first subset of the plurality of storage nodes;
send the first request to the first storage node;
receive the redirection response from the first storage node;
send a third request for the copy of the first data object to the second storage node based at least partly on the redirection response; and
receive the copy of the first data object from the second storage node.

2. The data storage system of claim 1, wherein the first storage node is further configured to at least:
track a quantity of requests received for the first data object;
determine that the first data object is a hot data object based on the quantity of requests; and
determine to send the redirection response based on the first data object being the hot data object.

3. The data storage system of claim 1, wherein the first gateway node is further configured to at least:
generate mapping data representing a second mapping of the first data object to the second storage node;
cause the mapping data to be made available to a second gateway node of the plurality of gateway nodes; and
determine to send a fourth request for the first data object to the second storage node based at least partly on the mapping data.

4. The data storage system of claim 1, wherein the first data object comprises a first erasure coded fragment of a file.

5. A computer-implemented method comprising:
under control of a storage node comprising memory and one or more computer processors configured to execute specific instructions:
generating latency data representing latency associated with servicing requests for data objects stored by the storage node;
receiving, from a gateway node, a first request for a first data object of the data objects stored by the storage node;
determining, based at least partly on the latency data, that a redirection criterion is satisfied;
determining, based at least partly on satisfaction of the redirection criterion, that the first request is to be redirected to a second storage node;
sending a redirection response to the gateway node, wherein the redirection response indicates that the gateway node is to obtain the first data object from the second storage node; and
sending a replica of the first data object to the second storage node without receiving a request from the second storage node.

6. The computer-implemented method of claim 5, further comprising:
tracking a quantity of requests for the first data object; and
determining that the quantity of requests satisfies a request threshold, wherein determining that the first request is to be redirected to the second storage node is based at least partly on satisfaction of the redirection criterion and satisfaction of the request threshold.

7. The computer-implemented method of claim 5, wherein determining, based at least partly on the latency data, that the redirection criterion is satisfied comprises determining that a period of time between receiving a prior request and responding to the prior request exceeds a threshold period of time.

8. The computer-implemented method of claim 5, wherein determining that the redirection criterion is satisfied is based further on a degree of latency experienced by a data accessor device in response to a prior request, wherein the first request comprises second latency data representing the degree of latency.

9. The computer-implemented method of claim 5, further comprising receiving second latency data representing a degree of latency experienced by a networking device, wherein determining that the redirection criterion is satisfied is based further on the degree of latency experienced by the networking device.

10. The computer-implemented method of claim 5, further comprising selecting the second storage node from a plurality of storage nodes, wherein the storage node is in a first subset of the plurality of storage nodes, wherein the second storage node is in a second subset of the plurality of storage nodes, wherein individual storage nodes of the first subset of the plurality of storage nodes store the first data object.

11. The computer-implemented method of claim 5, further comprising:
   receiving, from a second gateway node, a second request for a second data object;
   determining that the second request is associated with a redirection from a third storage node;
   obtaining a replica of the second data object from the third storage node;
   storing the replica of the second data object in a cache; and
   sending the replica of the second data object to one of the second gateway node or a data accessor in response to the second request.

12. A system comprising a plurality of storage nodes, wherein a first storage node of the plurality of storage nodes comprises one or more computer processors programmed by executable instructions to at least:
   generate latency data representing latency associated with servicing requests for individual data objects of a plurality of data objects stored on the first storage node;
   receive, from a gateway node, a first request for a first data object of the plurality of data objects;
   determine, based at least partly on the latency data, that a redirection criterion is satisfied;
   determine, based at least partly on satisfaction of the redirection criterion, that the first request is to be redirected to a second storage node of the plurality of storage nodes;
   send a redirection response to the gateway node, wherein the redirection response indicates that the gateway node is to obtain the first data object from the second storage node;
   receive, from the second storage node, a second request for the first data object; and
   in response to the second request, send a replica of the first data object to the second storage node.

13. The system of claim 12, wherein the one or more computer processors of the first storage node are programmed by further executable instructions to:
   track a quantity of requests for the first data object; and
   determine that the quantity of requests satisfies a request threshold, wherein the determination that the first request is to be redirected to the second storage node is based at least partly on satisfaction of the redirection criterion and satisfaction of the request threshold.

14. The system of claim 12, wherein to determine, based at least partly on the latency data, that the redirection criterion is satisfied, the one or more computer processors of the first storage node are programmed by further executable instructions to determine that a period of time between receiving a prior request and responding to the prior request exceeds a threshold period of time.

15. The system of claim 12, wherein to determine that the redirection criterion is satisfied, the one or more computer processors of the first storage node are programmed by further executable instructions to evaluate a degree of latency experienced by a data accessor device in response to a prior request, wherein the first request comprises second latency data representing the degree of latency.

16. The system of claim 12, wherein the one or more computer processors of the first storage node are programmed by further executable instructions to select the second storage node from a plurality of storage nodes, wherein the storage node is in a first subset of the plurality of storage nodes, wherein the second storage node is in a second subset of the plurality of storage nodes, wherein individual storage nodes of the first subset of the plurality of storage nodes store the first data object.

\* \* \* \* \*

UNITED STATES PATENT AND TRADEMARK OFFICE
CERTIFICATE OF CORRECTION

PATENT NO. : 11,971,902 B1
APPLICATION NO. : 17/456706
DATED : April 30, 2024
INVENTOR(S) : Andrew Kent Warfield et al.

It is certified that error appears in the above-identified patent and that said Letters Patent is hereby corrected as shown below:

In the Specification

Column 1, Line 48 (approx.), delete "embodiments" and insert -- embodiments. --.

Column 8, Line 25, after "1" delete "terabyte".

Column 15, Line 34, delete "1040N" and insert -- 140N --.

Signed and Sealed this
Thirtieth Day of July, 2024

Katherine Kelly Vidal
*Director of the United States Patent and Trademark Office*